UNITED STATES PATENT OFFICE.

RICHARD KOREFF, OF PRAGUE, AUSTRIA-HUNGARY, ASSIGNOR TO KINZLBERGER & CO., OF SAME PLACE.

NEW AMIDO BASE AND COLORS THEREFROM.

SPECIFICATION forming part of Letters Patent No. 541,859, dated July 2, 1895.

Application filed April 17, 1894. Serial No. 507,903. (Specimens.) Patented in England March 12, 1894, No. 5,143; in France March 27, 1894, No. 237,358, and in Austria June 15, 1894, No. 44/2,468.

*To all whom it may concern:*

Be it known that I, RICHARD KOREFF, a subject of the Emperor of Austria-Hungary, residing at Prague, in the Province of Bohemia, in the Empire of Austria-Hungary, have invented certain new and useful Improvements in the Manufacture of New Amido Bases and of Azo Coloring-Matters Therefrom, (for which Letters Patent have been obtained in Austria, No. 44/2,468, dated June 15, 1894; in France, No. 237,358, dated March 27, 1894, and in Great Britain, No. 5,143, dated March 12, 1894;) and I do hereby declare the following to be a full, clear, and exact description of the invention, such as will enable others skilled in the art to which it appertains to make and use the same.

The reaction of formaldehyde upon anilin, ortho-toluidin, alpha-naphtylamin, benzidin, tolidin and dianisidin has already been investigated by various persons, such as Tollens, Schiff, Pulvermacher, and Brack (Letters Patent No. 515,897, dated March 6, 1894, and No. 516,753, dated March 20, 1894). In all such investigations it was observed that the formaldehyde always condensed with the particular amin in such manner, that it takes either two hydrogen atoms from one amido group, or one hydrogen atom from each of two amido groups for condensation, yielding bodies, which either have not more at all basic properties, or are secondary amines.

An apparent exception is made by the bases discovered by Brack (*ut supra*), which he obtained by condensation of formaldehyde with benzidin, tolidin and dianisidin, and which contain free amido groups; but also in this case the condensation took place in such manner, that a part of the amido group was substituted, while only amido groups in excess remained unaffected.

I have discovered that formaldehyde is capable of condensing with the said amins in such manner as to leave the amido groups intact, if the condensation be effected in concentrated sulfuric acid. By this means new primary amins are obtained which are of particular interest on account of their being capable of producing valuable new azo coloring matters.

*Example I.*—21.4 kilos ortho-toluidin are dissolved in one hundred kilos sulfuric acid of 66° Baumé, and are gradually mixed with 7.5 kilos formaldehyde of forty per cent. The mixture is stirred for some time, until the condensation of the formaldehyde with the toluidin has taken place, which is effected in a short space of time. The mass is poured into water and the solution is rendered alkaline, whereby the new compound is deposited as a yellowish precipitate. Any residue of ortho-toluidin that may not have entered into the reaction, is driven off by means of steam, whereby the new base is obtained from the precipitate in the form of an oily body. The base is allowed to coagulate, after which it is filtered, washed and pressed, whereby the condensation product is obtained of the requisite purity.

The new base dissolves easily in acids or alcohol and the mineral acid solutions give with nitrite readily and smoothly diazo bodies. The nitrite thus consumed shows accurately, that no substitution of the amido groups has taken place. The new base is essentially characterized by its melting point, which is about 60° centigrade, and its incapacity for crystallization. The reaction is carried out as follows:

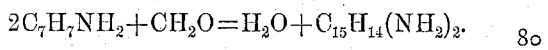

$$2C_7H_7NH_2 + CH_2O = H_2O + C_{15}H_{14}(NH_2)_2.$$

The diazo-compound prepared from the base gives with phenols, amins, and their sulfo acids or with carbon acids coloring matters that dye wool in an acid bath, and that are favorably distinguished from the corresponding ortho-toluidin colors by their bluer tints and slower development.

*Example II.*—28.6 kilos alpha-naphtylamin are dissolved in the sixfold quantity of concentrated sulfuric acid, and are condensed with 7.5 kilos formaldehyde of forty per cent., the operation being effected also in this case rapidly and smoothly. The mass is poured into water, the sulfate of the new base remaining in solution, which latter is then rendered alkaline, and the new base is precipitated and separated by filtration. After separation it appears as a gray-white body, that melts at about 60° centigrade and is slightly soluble in alcohol and ether, whereby it is easily possible to remove the last remaining particles of alpha-naphtylamin. The base is easily soluble in dilute sulfuric or hydrochloric acid, and gives with nitrite an easily soluble diazo-compound, which forms with phenols, amins and their sulfo acids or with carbon acids new azo coloring matters, that equalize well. The condensation is carried out as follows:

$$2C_{10}H_7NH_2 + CH_2O = H_2O + CH_2(C_{10}H_6NH_2)_2.$$

*Example III.*—42.4 kilos ortho-tolidin are dissolved in four hundred kilos concentrated sulfuric acid, and 7.5 of forty per cent. formaldehyde are stirred into the cooled solution. The smell of formaldehyde disappears by degrees, the end of the condensation process being recognizable by the fact, that on dropping a sample into water, the crystalline separation of the—with difficulty soluble—tolidin-sulfate no longer takes place. The mass is now poured into two thousand five hundred liters of cold water, and if the reaction has been conducted correctly, a clear yellowish solution will be obtained, of which a measured quantity, when determined by nitrite, will accurately agree with the quantity of tolidin employed, which proves, that no reaction of the formaldehyde upon the amido groups has taken place. I have succeeded in finding in this acid solution two isomeric bases, which can be separated very easily, as the one base gives a sulfate, that dissolves with great difficulty in water or slightly acidulated water, while the second base gives very easily soluble salts. If now to the acid solution of the two bases—as obtained by pouring the original reaction mass into water—an alkali is carefully added, the sulfate of the one base (base S), that yields the sulfate of difficult solubility, will be entirely precipitated, before the acid solution has become perfectly neutral, while the filtrate contains the sulfate of the second base (base L) in solution, this being only precipitated from the solution, when this has become alkaline.

The new bases are easily distinguishable from ortho-tolidin, for whereas the latter is soluble with difficulty in hydrochloric acid (of about ten per cent.) and is nearly insoluble in dilute sulfuric acid and oxalic acid, all the salts of the new bases are obtained at normal temperatures. They are partly soluble, and become entirely soluble when slightly heated.

The base S gives a neutral sulfate soluble with difficulty in water, which however—unlike tolidin—is easily soluble in dilute sulfuric acid. The melting point of the new bases, which are always obtained in an amorphous condition, is about 60° centigrade, while the easily crystallizable tolidin melts exactly at 130° centigrade.

The new bases are also very clearly different from that of Brack (Letters Patent No. 515,897, dated March 6, 1894, and No. 516,753, dated March 20, 1894,) as shown by the following constitutional formulæ of the two:

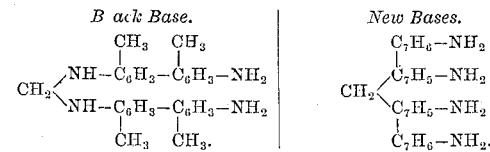

The condensation, by which the new bases are formed, is carried out according to the following scheme:

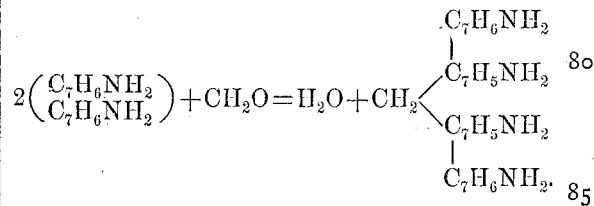

The tetrazo compounds of the new bases are very easily soluble, while the azo-compound of the Brack base (Letters Patent No. 516,753, dated March 20, 1894,) is described as only slightly soluble. The new bases are precipitated from their solutions by alkalies in the form of easily filtered white flocky substances, while the Brack base is precipitated from the sulfate solution by carbonate of soda as a light green, resinous mass that quickly solidifies. The new bases are furthermore very different from the Brack base as for their solubility in ether, the former being tolerably easily soluble in ether, while the latter is almost insoluble in it. The coloring matters prepared from the two bases are very different from those yielded by the Brack base.

I have combined the bases with the following amins and phenols and obtained therefrom valuable coloring matters.

With two molecules of: salicylic-acid, yellow; naphtionic-acid, red; 1.5 naphtylamine sulfo-acid, red; Brönner's acid (beta-naphtylamin-beta-sulfo-acid), red; beta-naphtylamine-delta-sulfo-acid, red; 1.4 naphtol sulfo-acid, blue violet; with one molecule of naphtionic-acid and one molecule of 1.4 naphtol-sulfo-acid, claret; with two molecules of gamma-amidonaphtol-sulfo-acid (alkaline), black; with one molecule of gamma-amidonaphtol-sulfo-acid (acid) and one molecule of salicylic acid, red; one molecule of alpha-naphtylamin further diazotised and combined with 1.4 naphtol-sulfo-acid, blue black. Generally speaking, these coloring matters resemble in their properties those prepared from tolidin. The tints of the former are however somewhat yellower, without being inferior to the latter as regards brightness.

*Example IV.*—The condensation of ortho-dianisidin is effected as easily as with ortho-tolidin; if 48.8 kilos of ortho-dianisidin are dissolved in concentrated sulfuric acid and there is added the calculated quantity of formaldehyde (in the present case 7.5 kilos of a forty per cent. material), and after the smell of formaldehyde has disappeared the mass is treated as by the condensation of tolidin, there will, also in this case, be obtained a base, which contains the amido groups intact, and which can be easily distinguished from orthodianisidin. This base gives easily and smoothly a tetrazo body.

I claim—

1. The process of obtaining new primary amines, which consists in condensing a solution of an amine such as herein described, in concentrated sulfuric acid and formaldehyde.

2. New primary amines, the melting point of which is about 60° centigrade, consisting of a non-crystallizable condensation product of formaldehyde with an amine such as herein described said primary amines being soluble in ether, obtainable in the form of a white precipitate from acid solutions, and yielding readily soluble diazo and tetrazo compounds.

In testimony whereof I affix my signature in presence of two witnesses.

RICHARD KOREFF.

Witnesses:
B. BÖHNN,
F. MUHLERT.